United States Patent [19]

Nozu et al.

[11] 4,342,528
[45] Aug. 3, 1982

[54] TAPPING MACHINE

[75] Inventors: Takashi Nozu; Minoru Yamada; Yasuhiko Watanabe, all of Nagoya, Japan

[73] Assignee: Brother Kogyo Kabushiki Kaisha, Aichi, Japan

[21] Appl. No.: 187,547

[22] Filed: Sep. 16, 1980

[30] Foreign Application Priority Data

Sep. 29, 1979 [JP] Japan ................................. 54-125510

[51] Int. Cl.³ ........................ B23B 35/00; B23B 41/18
[52] U.S. Cl. ............................................ 408/6; 408/9; 408/11
[58] Field of Search .............. 73/862.34; 82/1 C, 2 B, 82/29 R; 316/164; 408/3, 6, 9, 10, 11, 12, 16, 128, 238

[56] References Cited

U.S. PATENT DOCUMENTS

| | | | |
|---|---|---|---|
| 3,259,023 | 7/1966 | Rieger et al. | 408/11 |
| 3,446,099 | 5/1969 | Lesher et al. | 408/10 |
| 3,545,310 | 6/1968 | Porath et al. | 408/11 |
| 3,552,236 | 1/1971 | Meszaros | 408/9 |
| 4,090,802 | 5/1978 | Bilz | 408/9 |
| 4,157,231 | 6/1979 | Phillips | 408/9 |

*Primary Examiner*—William R. Briggs
*Assistant Examiner*—Paul M. Heyrana, Sr.
*Attorney, Agent, or Firm*—Browdy & Neimark

[57] ABSTRACT

A tapping machine provided with a quill for rotatably supporting a spindle which holds a tap on one end thereof, a reversible electric motor for rotating the spindle and axially reciprocating the quill, an overload release clutch mounted in a power transmitting mechanism which is disposed between the quill and the motor, for suspending the power transmission between the quill and the motor when an overload is applied on the quill, and pulse signal generating means mounted between the clutch and the quill in the power transmitting mechanism for generating one pulse signal in response to each one pre-set unit distance of the quill during the forward motion thereof. The tapping machine performs a working cycle in good order wherein the spindle advances from the start position while being forwardly rotated until the number of pulse signals generated from the pulse signal generating means accords with a pre-set number and returns while being backwardly rotated back to the start position. The tapping machine is also provided with means for generating overload sensing signal when an interval between any two pulse signals from the pulse signal generating means exceeds a predetermined time duration, so as to backwardly rotate the motor immediately after the generation of the overload sensing signal, that is, an abnormal condition warning signal for returning the spindle to the start position.

7 Claims, 12 Drawing Figures

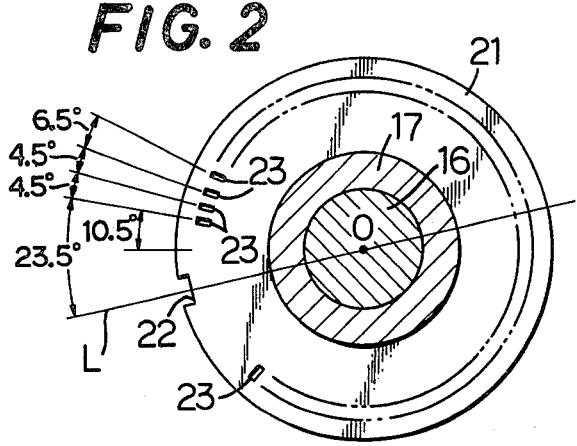
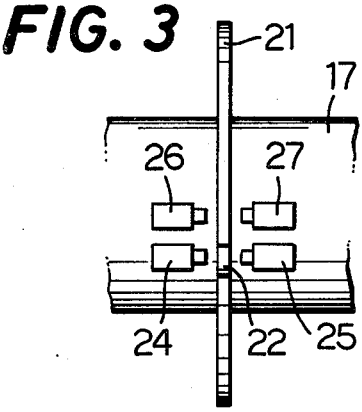
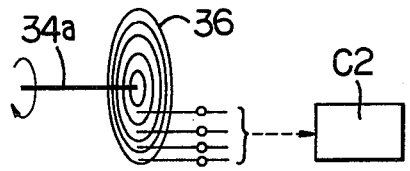
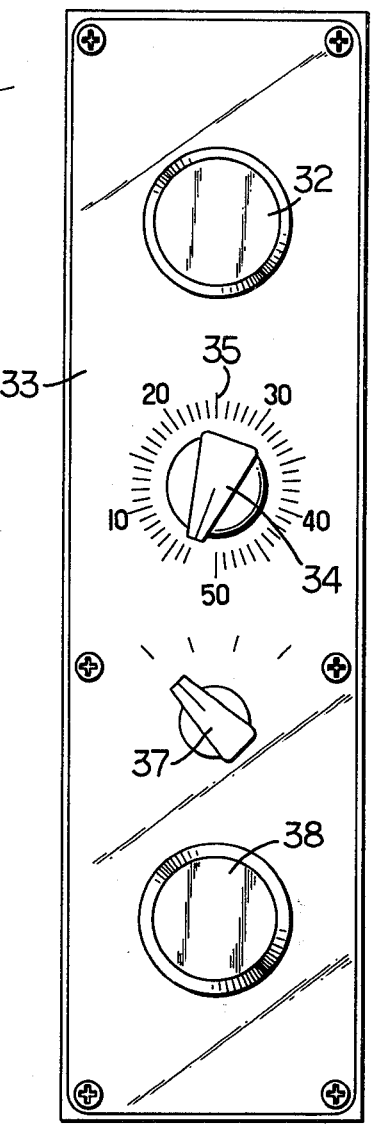

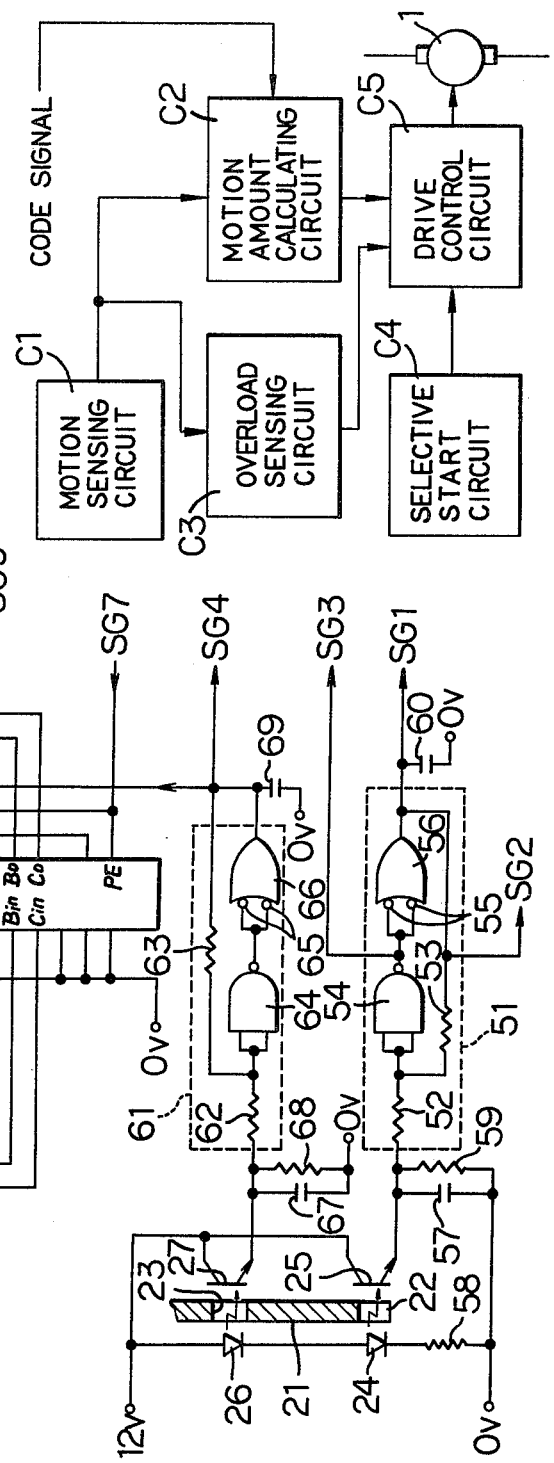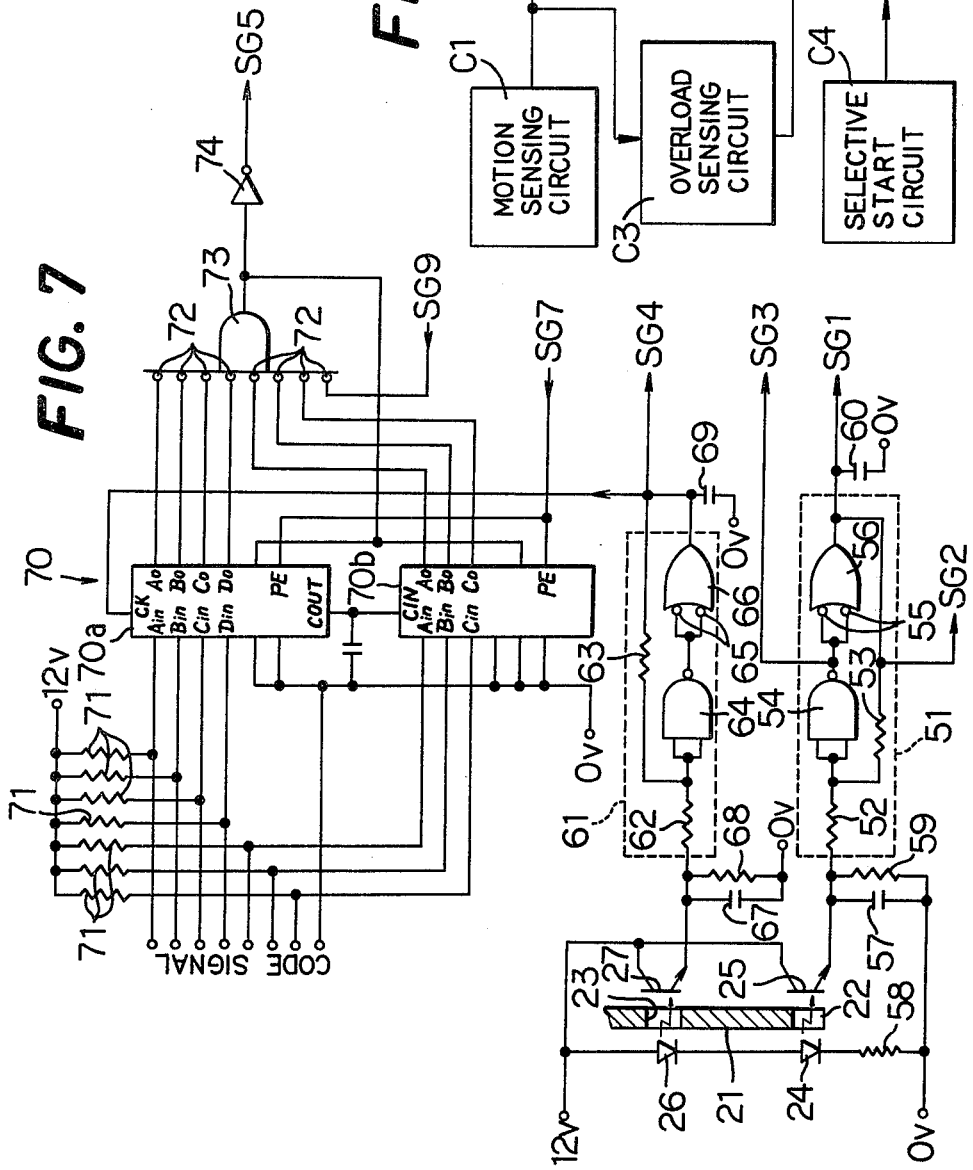

TAPPING MACHINE

FIELD OF THE INVENTION

This invention relates to a tapping machine with an overload sensing device, which is capable of sensing an overload or an abnormal condition of blocking the motion of a tap, for restoring the same to the original or start position.

BACKGROUND OF THE INVENTION

This invention relates to a tapping machine with a reciprocally movable quill and a spindle, carried by the quill in a forwardly and backwardly rotatable manner, for removably supporting on one end thereof a tap, and more particularly a tapping machine wherein when the quill is suspended of its motion due to the action of an overload release clutch disposed in a power transmitting mechanism between the quill and the drive source, a motor, an overload sensing device senses it immediately for generating a signal, and the quill is returned to the start position based on the signal from the overload sensing device.

In the conventional tapping machines a device for setting a forward stroke of the quill is disposed in a member which is interlocked with a power transmitting mechanism between the motor and the overload release clutch. Therefore, a suspension of the power transmitting by the clutch caused by an overload applied on the quill will not affect the motor rotation, and only when a backward rotation signal from a forward stroke setting device is generated the motor is backwardly rotated to restore the quill to the start position.

As the overload release clutch of this kind a friction clutch is most usually employed. Therefore, even after the suspension of the power transmitting by the overload release clutch, which is a friction clutch, a force to further advance the quill is continuously applied on the friction clutch before the motor begins to be backwardly rotated, which causes various disadvantages such as wear of the friction clutch, damage of parts in the power transmitting mechanism, abnormal overheat of the motor, etc.

SUMMARY OF THE INVENTION

The primary object of this invention is to eliminate the above-mentioned disadvantages in the prior art.

A preferred tapping machine in accordance with this invention is provided with, (a) a quill rotatably carrying a spindle which holds a screw tap on one end thereof, (b) a reversible electric motor for rotating the spindle in forward and backward direction and for reciprocally moving the quill, (c) an overload release clutch, disposed in a power transmitting mechanism between the motor and the quill, for suspending when an overload is applied on the quill the power transmitting between the motor and the quill, (d) pulse signal generating means, disposed in a power transmitting mechanism between the overload release clutch and the quill, for generating one pulse signal in response to each one unit distance of motion of the quill, (e) a preset counter for setting beforehand the number of pulse signals corresponding to the forward stroke of the quill, (f) turn position sensing means for generating a sensing signal when the number of pulse signals generated during the forward movement of the quill from the pulse signal generating means accords with the number of pulse signals preset in the preset counter, and (g) overload sensing means for generating a sensing signal when the pulse signal generating means does not generate, while the quill is to be in the forward movement, a pulse signal for a certain predetermined time duration.

And when the quill has been, while the spindle is rotated in the forward direction (clockwise), advanced from the start position and a sensing signal has been generated from the turn position sensing means, the rotational direction of the motor is reversed for returning the quill back to the start position, while the spindle is rotated in the backward direction (counterclockwise), so as to complete one working cycle.

If a sensing signal is generated from the overload sensing means during the forward movement of the quill in this working cycle, the rotational direction of the motor is instantly changed or reversed to return the quill back to the start position. Therefore, when the quill is applied, during the working of tapping, with an overload to largely decelerate its moving speed or completely halt its motion due to the action of the overload release clutch, it is instantly returned back to the start position owing to a reversion of the rotational direction of the motor, which makes it possible to completely eliminate the disadvantages of the prior art.

In a further improved embodiment of this invention, a first control circuit for stopping the motor when the working cycle has been finished once, a second control circuit for allowing repeated operation of the working cycle, and selecting means for selectively switching between the first control circuit and the second control circuit are provided.

In this instance, when the quill is applied with an overload to be halted it is instantly returned back to the start position accompanied by the stoppage of the motor, regardless of the state of the choice either one of the first control circuit and the second control circuit. It assures the identical effect in this embodiment to that in the previous embodiment.

BRIEF DESCRIPTION OF THE DRAWINGS

FIG. 2 and FIG. 3 are respectively an elevation and a profile of a rotary plate in this embodiment;

FIG. 4 is an elevation of an operation board in this embodiment;

FIG. 5 is an explanatory view of an encoder in this embodiment;

FIG. 6 is an electrical block diagram in this embodiment of a tapping machine;

FIGS. 7–11 are respectively an electrical circuit diagram in this embodiment of a tapping machine.

DETAILED DESCRIPTION OF THE PREFERRED EMBODIMENTS

Figure 1:
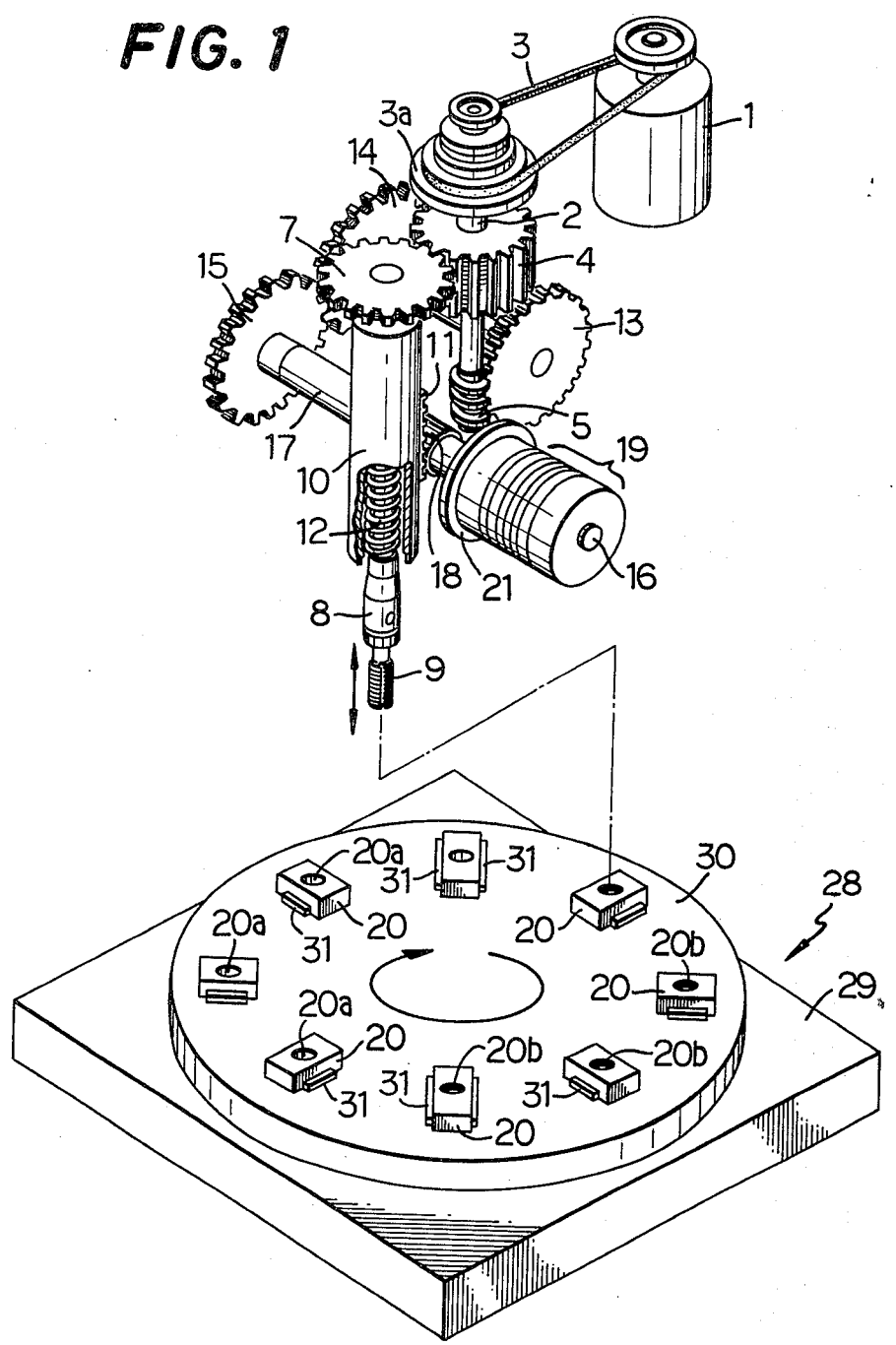
FIG. 1 is a perspective view of an essential portion, which is partly taken away from an embodiment of a tapping machine wherein this invention is realized.

A preferred embodiment of a tapping machine with a overload sensing device, realizing the present invention therein, will be described with reference to the appended drawings firstly.

A reversible electric motor 1 rotatable in either the forward and backward direction, being mounted on a machine frame (not shown), is drivingly connected via a belt 3 to a drive shaft 2. The drive shaft 2 is provided on the upper portion thereof with a pulley 3a, almost in the middle portion thereof with a wide gear 4, and on the lower portion thereof with a worm 5. A spindle 6 having a spindle gear 7 on the upper portion thereof is rotatable through meshing with the wide gear 4. The spindle holds a screw tap 9 for forming a female screw with a tap chuck 8 on the lower end thereof. A quill 10 axially reciprocably retained to the machine frame supports the spindle 6 rotatably, on the external surface thereof a rack 11 being formed. Inside the quill 10 an anti-backlash coil spring 12 is disposed about the spindle 6.

A worm wheel 13 meshed with the worm 5 on the drive shaft 2 rotates a rotary shaft 16 by way of gears 14 and 15. A pinion shaft 17 of cylindrical form is provided with a pinion 18 which is meshed with a rack 11 on the quill 10, and operatively connected with the rotary shaft 16 by way of an overload release clutch 19 of multi-plate type for disconnecting the power transmission from the shaft 16 when an excessive torque is applied on the tap 9. When the motor 1 is forwardly rotated the pinion shaft 17 is, owing to the gear ratio between the gears 14 and 15, counterclockwise rotated within a sphere or limit of one rotation for causing the quill 10 to perform an advancing or descending movement and at the same time the spindle 6 is forwardly rotated, which makes the tap 9 carry out a tapping operating in a pre-bored hole in a work. A backward rotation of the motor 1 causes on the contrary the quill 10 to be ascended or returned to the original start position accompanied by a backward rotation of the spindle 6, which makes the tap 9 to be retracted from the work for finishing one cycle of tapping operation.

A rotary plate 21 of circular form secured to the pinion shaft 17 is provided with a notch 22 formed on one portion of the circumferential surface thereof for sensing the start position, that is the upper most position of the tap 9. Numeral 23 in FIG. 2 designates a plurality of slits for sensing the motion amount of the tap 9, forty eight in this embodiment, in which three, starting from a position 23.5° by the center angle in the clockwise direction away from a base line L linking the notch 22 and the center O of the rotary plate 21, are arranged with an equal inter-angular-distance of 4.5° by the center angle on one circle concentrical with the rotary plate 21, and the remaining forty five are arranged with an equal inter-angular-distance of 6.5° by the center angle on the same circle.

Opposed to either side of the rotary plate 21 a light-emitting diode or luminescent diode (LED) 24 and a photo-transistor 25 are disposed as shown in FIG. 3. When the tap 9 is positioned at the start position the photo-transistor 25 can receive light from the LED 24 through the notch 22 owing to the mutual relative position arranged in opposition with the notch 22 inbetween. Opposed to either side of the rotary plate 21 another LED 26 and another photo-transistor 27 are disposed in such a manner as to sandwich the rotary plate 21 inbetween on the same circle as the plurality of slits 23 for being sensed. The LED 26 and the photo-transistor 27 are arranged such that when the tap 9 is at the start position both are oppositely positioned biased to the base line L with an angle distance 10.5° away from the slit 23 nearest to the base line L.

The rotary plate 21 is rotated in this embodiment at a rate that the pitch 6.5° of the slits 23 corresponds to the motion amount 1 mm of the tap 9 in descending and ascending. Continuous pulse signals emitted from the photo-transistor 27, which intermittently receives light from the LED 26, will be delivered to a later described motion amount calculating circuit C2 for being calculated at a rate of assuming each one pulse being corresponded to 1 mm motion of the tap 9.

Although the initial three slits 23 nearest to the base line L are arranged in this embodiment, starting from a position 23.5° by the center angle away from the base line L in the clockwise direction, with an equal inter-angular-distance of 4.5°, with the object of preventing the photo-transistor 27 from receiving diffused reflection which may cause a mal-operation thereof from the LED 26 through the slits nearby, when the tap 9 is at the start position, those 48 slits may be so arranged as to start from a position 19.5° by the center angle away from the base line L in the clockwise direction, with an equal inter-angular-distance of 6.5° on the same circle. In this instance the motion amount of the tap 9 can be exactly sensed from the initial pulse when the tap 9 begins to descend from the start position.

A work feeder 28, disposed beneath the tap 9 for feeding works in order to a position to be processed by the tap 9, consists of a frame 29 and an index table 30 rotatably attached to the frame 29. The index table 30 is placed under control of control signals so as to be intermittently rotatable in the clockwise direction in FIG. 1, on the top surface thereof eight clamps 31 being arranged with an equal angular distance on one circle concentrical to the index table 30 for feeding a work 20 one by one according to the intermittent rotation of the index table 30 to right beneath the tap 9, that is a position to be tapped. The only operation expected from the operator is limited to remove from the clamp 31 a work having a tapped bore 20b, which has been finished of tapping in a bore 20a formed beforehand, and to fix a fresh work pre-bored to the clamp 31 regularly.

With reference to FIG. 4 an operation board 33 attached on one side of the machine frame (not shown) will be described. On the upper portion of the operation board 33 an emergency return switch 32 is disposed, whose depression will instantly stop the tapping process, irrespective of a working cycle being in progress, to restore the tap 9 to the start position. A stroke setting dial 34 is disposed beneath the emergency return switch 32, whose adjusting to a desired scale 35 will set the descending motion amount of the tap 9. An encoder 36 is for providing a code signal corresponding to the motion amount of the tap 9 set by the dial 34 to a later described motion amount calculating circuit C2 as a condified preset signal.

A mode selecting switch 37 is disposed beneath the stroke setting dial 34 for selectively changing the operation mode of the tapping machine to any one of a repeating operation, a single operation, an inching operation, and an interlocking operation started by a starting signal from an external source other than the tapping machine in question. Numeral 38 designates a starting switch disposed beneath the mode selecting switch 37.

An electric circuit for controlling the operation of the tapping machine having an overload (abnormal condition) sensing device of the aforementioned structure will be described next.

The electric circuit built-in within the tapping machine is composed of, as generally illustrated in FIG. 6, the following five circuits:

a motion sensing circuit C1, consisting of the LEDs 24, 26 and the photo-transistors 25, 27, for generating a pulse per each one unit distance motion of the tap 9 so as to sense the ascending and descending motion of the tap 9;

a motion amount calculating circuit C2, in which a codified value of the ascending and descending motion range of the tap 9 is preset, due to the operation of the stroke setting dial 34, via the encoder 36, for calculating the position of the tap 9 in motion based on an output signal from the motion sensing circuit C1;

an overload sensing circuit C3, having an overload warning device, for sensing an overload condition of the tap 9 during the descending motion of the tap 9 based on an output from the motion sensing circuit C1;

a selective start circuit C4 for starting the tapping machine upon selecting an operation mode thereof; and a drive control circuit C5 for controlling the working cycle based on an output signal from the selective start circuit C4 and controlling the motor 1 in a reverse direction (backward direction) based on each commanding signal from the motion amount calculating circuit C2 and the overload sensing circuit C3.

The explanation will be started here on the motion sensing circuit C1 with reference to FIG. 7.

A Schmidt trigger circuit 51, composed of a resistors 52, 53, a NAND circuit 54, a NOT circuit 55, and an OR circuit 56, is connected to an emitter terminal of the photo-transistor 25 which is turned ON upon sensing a light from the LED 24 via the notch 22 of the rotary plate 21, and output signal SG1, SG2 therefrom will be in high level, when the photo-transistor 25 is ON, and in low level, when the photo-transistor 25 is OFF, for being delivered to the later described drive control circuit C5. An output signal SG3 from the NAND circuit 54 of the Schmidt trigger circuit 51 is on the other hand a signal of opposite level to the output signal SG1 for being delivered to the later described drive control circuit C5. The tap 9 can be sensed whether it is in the start position by virtue of those output signals SG1, SG2, and SG3. Numeral 57 designates a capacitor, 58, 59 designate a resistor respectively, and 60 designates a capacitor connected to an output terminal of the Schmidt trigger circuit 51.

A Schmidt trigger circuit 61, composed of resistors 62, 63, a NAND circuit 64, a NOT circuit 65, and an OR circuit 66, is connected to an emitter terminal of the photo-transistor 27 which is turned ON upon sensing a light from the LED 26, and an output signal SG4 therefrom will be, when the photo-transistor 27 is ON, in high level, and in low level, when the photo-transistor 27 is OFF, for being delivered to the later described motion amount calculating circuit C2 and the overload sensing circuit C3. By the number of pulses of this output signal SG4 the motion amount of the tap 9 in either the descending and ascending motion can be sensed. Numeral 67 designates a capacitor, 68 designates a resistor, and 69 designates a capacitor connected to an output terminal of the Schmidt trigger circuit 61.

The motion amount calculating circuit C2 will be described next.

Numeral 70 designates a preset subtracting counter composed of a hexadecimal counter 70a and an octal counter 70b. The output signal SG4 is input to the hexadecimal counter 70a as a clock pulse, and a carry output terminal COUT of the hexadecimal counter 70a is connected to a carry input terminal CIN of the octal counter 70b. Each of resistors 71 is connected at one end thereof to each setting input terminal $A_{in}$, $B_{in}$, $C_{in}$, and $D_{in}$ of each counter 70a and 70b, and the other end thereof to an output terminal on the plus voltage side.

To each of the input terminals $A_{in}$, $B_{in}$, $C_{in}$, and $D_{in}$ a code signal corresponding to the descending and ascending amount of the tap 9 on the stroke setting dial 34 is provided by means of the encoder 36 as shown in FIG. 5. A suitable operation of the stroke setting dial 34 causes each BCD output terminal $A_o$, $B_o$, $C_o$ and $D_o$ of each counter 70a, 70b to be set at the value thereof. And each time the output signal SG4 from the Schmidt trigger circuit 61 of the motion sensing circuit C1 is provided to a carry input terminal CK of the hexadecimal counter 70a the preset subtracting counter 70 subtracts one by one, upon taking up the rising of the pulse signal, from the above-mentioned set value. In each counter 70a and 70b a presetting operation is carried out, through feeding of an output signal SG7 fed from an OR circuit 148 of the later described drive control circuit C5 to their preset input terminal PE.

BCD output from each counter 70a, 70b is respectively received, via NOT circuits 72, by an AND circuit 73. A NOT circuit 74 receives an output of the AND circuit 73 as its input, and an output signal SG5 therefrom is delivered to the later described drive control circuit C5.

Figure 8:
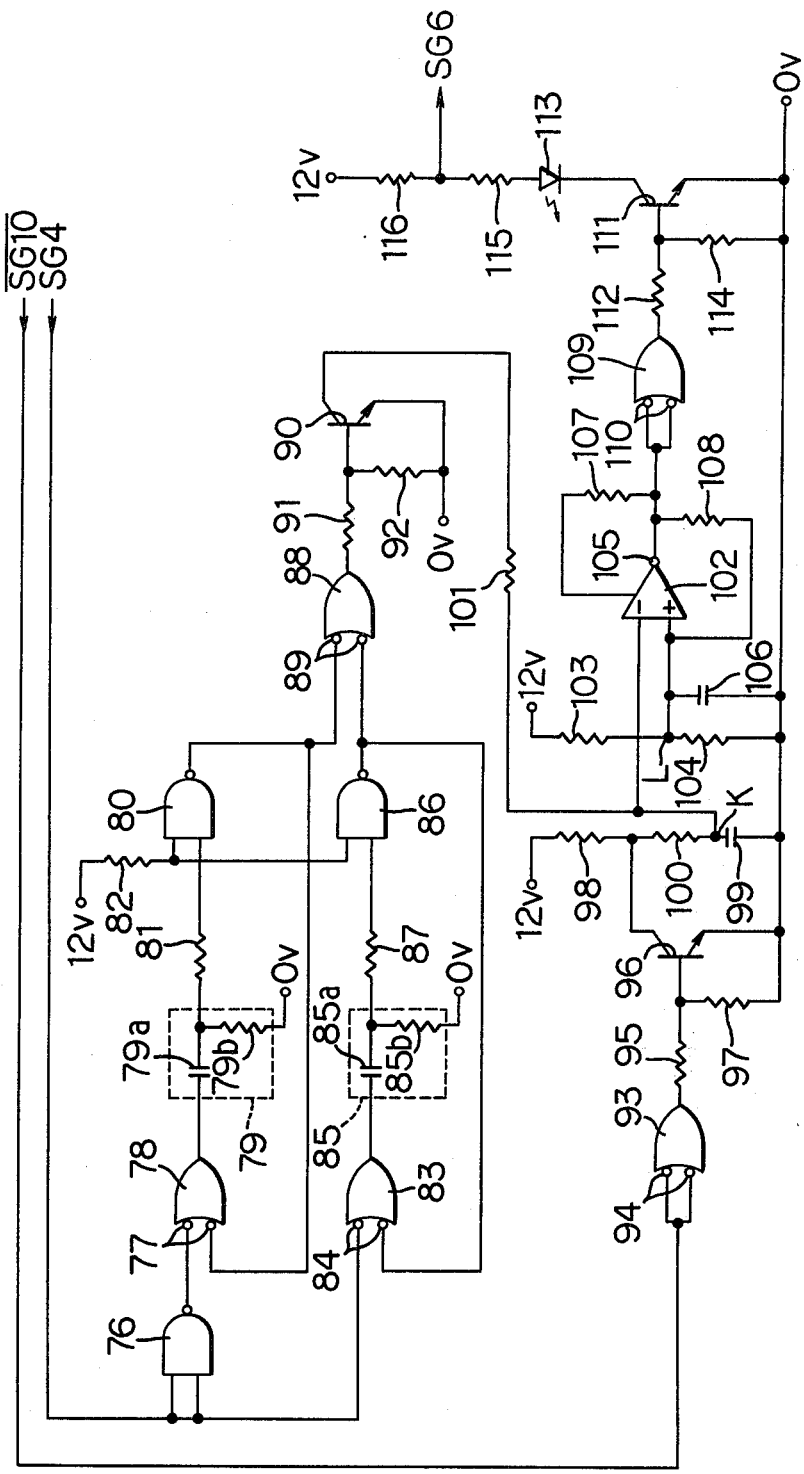

Now the overload sensing circuit C3 for sensing an overload (abnormal condition) of the tap 9 during the descending motion thereof owing to the output signal SG4 from the motion sensing circuit C1 will be described with reference to FIG. 8.

A NAND circuit 76, which receives the output signal SG4 from the Schmidt trigger circuit 61 as its input, is connected with its output terminal to an OR circuit 78 via a NOT circuit 77. A differentiating circuit 79, which receives an output from the OR circuit 78 as its input, is composed of a capacitor 79a and a resistor 79b. A NAND circuit 80 is connected at one input terminal thereof, via a resistor 81, to the differentiating circuit 79, and the other input terminal is connected, via a resistor 82, to the output terminal on the plus voltage side, an output terminal thereof being connected via a NOT circuit 77 to the other input terminal of the OR circuit 78. Therefore, against the output signal SG4 shown in FIG. 12 (a) each output wave form of the OR circuit 78 and the NAND circuit 80 will be as shown in FIG. 12 (b) and (c).

An OR circuit 83 receives the output signal SG4 as its input via a NOT circuit 84, and an output terminal thereof is connected to a differentiating circuit 85 consisting of a capacitor 85a and a resistor 85b. A NAND circuit 86 is connected at one input terminal to the differentiating circuit 85 via a resistor 87, the other input terminal being connected via the resistor 82 to the output terminal on the plus voltage side. The output terminal thereof is connected via a NOT circuit 84 to the other input terminal of the OR circuit 83. Therefore, against the output signal SG4 shown in FIG. 12 (a) each output wave form of the OR circuit 83 and the NAND circuit 86 will be as shown in FIG. 12 (d) and (e).

Figure 12:
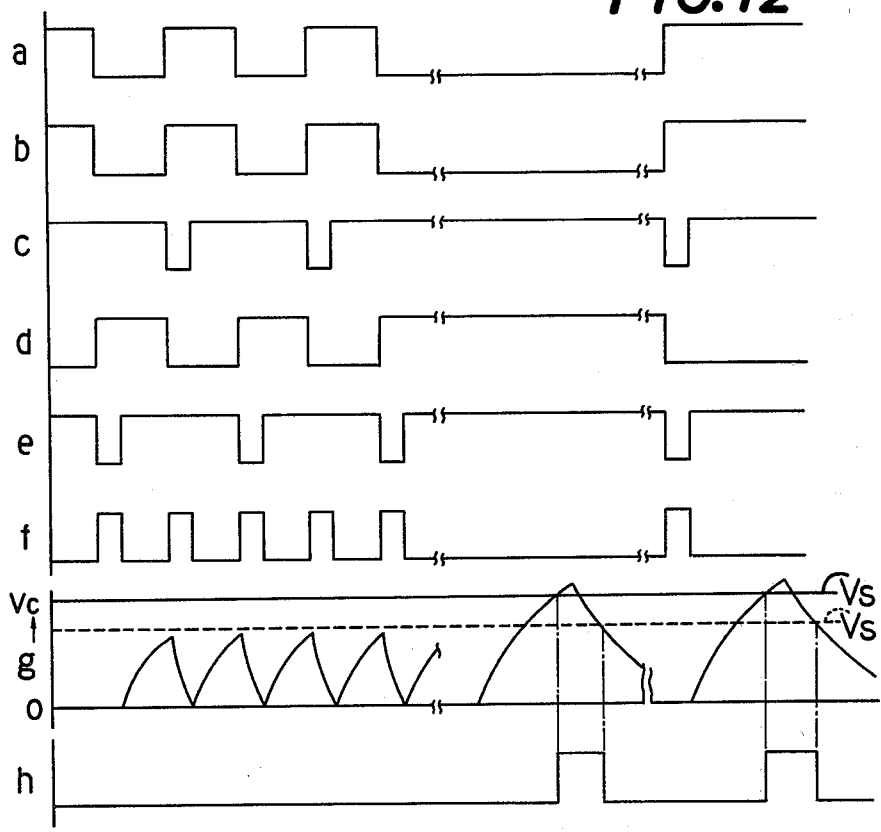
FIG. 12 is an output wave form of the electric circuit in the same tapping machine.

An OR circuit 88 receives an output from each of the OR circuits 80 and 86 via NOT circuits 89 as its input, and generates a signal having the wave form seen in FIG. 12 (f) against the output signal SG4. A transistor 90 for switching, whose base terminal is connected via a resistor 91 to the output terminal of the OR circuit 88, will be turned ON, when the output of the OR circuit 88 is in high level, and OFF when the same is in low level. Numeral 92 designates a resistor connected to the transistor 90 between the base and the emitter thereof. When the tap 9 is normally descended and the rotary plate 21 is normally rotated, the output signal SG4 from the motion sensing circuit C1 is a series of pulses with a certain regular interval or cycle, which consequently causes the switching transistor 90 to be turned ON and OFF with a constant cycle. When the tap 9 is prevented from descending in the course of a tapping work or process accompanied by halting of the rotation of the rotary plate 21, the output signal SG4 from the motion sensing circuit C1 will be maintained in either the high level state or the low level state as shown in the right side part of FIG. 12 (a), so the output wave form of the OR circuit 88 will be like that in FIG. 12 (f) with a result of keeping the switching transistor 90 at OFF state.

An OR circuit 93 receives an output signal $\overline{SG10}$, in an opposite level to a forward rotation signal SG10, output from the later described drive control circuit C5 as its input via a NOT circuit 94, and its output terminal is connected via a resistor 95 to the base terminal of a transistor 96 for switching. The forward rotation signal SG10 from the drive control circuit C5 is in low level when the motor 1 is in forward rotation and in high level when the motor is in backward rotation. Therefore the output signal $\overline{SG10}$ is in high level when the motor 1 is in forward rotation and in low level when the motor 1 is in backward rotation. A resistor 97 is connected to the switching transistor 96 between the base and the emitter thereof; a resistor 98 is connected at one terminal thereof to the collector terminal of the switching transistor 96 and at the other terminal to the output terminal on the plus voltage side.

A capacitor 99 is connected at one terminal, via a resistor 100, to the collector terminal of the switching transistor 96 and at the other terminal to the emitter terminal of the switching transistor 96, and to a junction K between the capacitor 99 and the resistor 100 the collector terminal of the switching transistor 90 is connected via a resistor 101.

When the motor 1 is in forward rotation and the output signal $\overline{SG10}$ is in high level, the switching transistor 96 will naturally be OFF, the capacitor 99 is charged by way of the resistors 98 and 100. When the switching transistor 90 is turned from OFF to ON at this state owing to the output signal SG4 the capacitor 99 in charging will be discharged via the resistor 101, as shown in FIG. 12 (g). When the switching transistor 90 is returned from ON to OFF, the capacitor 99 will be started in charging again. The time for charging and discharging for this capacitor 99 is respectively set at the resistors 100 and 101. And when the output signal $\overline{SG10}$ is in low level, while the motor 1 is in backward rotation or in halting, the capacitor 99 is not charged because of the switching transistor 96 being in ON state.

A comparator 102, an operational amplifier, is connected at its minus input terminal to the junction K and is connected at its plus input terminal to a junction L of resistors 103, 104 for setting a standard voltage. The comparator 102 compares the standard voltage Vs of the junction L and the voltage of the junction K, that is the charged voltage Vc of the capacitor 99, for providing an output signal of low level via NOT circuits 105 and 110 to an OR circuit 109 when the charging voltage Vc is larger than the standard voltage Vs. A capacitor 106 is parallelly connected with the standard voltage setting resistor 104. Numeral 107 designates a resistor. A feed back resistor 108 is connected via the NOT circuit 105 between the plus input terminal of the comparator 102 and an output side terminal of the comparator 102.

An OR circuit 109 receives an output signal from the comparator 102 as its input for generating, when the charging voltage Vc has become higher than standard voltage Vs as shown in FIG. 12 (g), an output signal of high level as shown in FIG. 12 (h). A switching transistor 111 receives at its base terminal an output signal of the OR circuit 109 as its input via a resistor 112, for being turned ON by a high level signal from the OR circuit 109, and renders an LED 113 for warning, which is being connected to a collector terminal of the transistor 111, luminescent. The switching transistor 111 provides, when it is ON, a commanding signal SG6 of low level, and when it is OFF a high level one, to the drive control circuit C5. Numerals 114, 115 and 116 respectively designate a resistor.

When the tap 9 is suspended and the switching transistor 90 is maintained in OFF state, the charged voltage Vc of the capacitor 99 exceeds the standard voltage Vs to turn the switching transistor 111 ON for turning in turn the commanding signal SG6 from high to low level and rendering the LED 113 luminescent, which informs the operator of an abnormal condition or an overload of the tap 9.

As the output signal provided from the comparator 102 via the NOT circuit 105 is fed back via the resistor 108 to the terminal on the plus input side of the comparator 102, the standard voltage Vs will be lowered when the output signal comes down to low level. Therefore, when in response to the transmission of the commanding signal SG6, which has been turned to low level due to that output signal of low level, to the later described drive control circuit C5, a low level signal is transmitted from the drive control circuit C5 as the output signal $\overline{SG10}$ for turning the switching transistor 96 ON and gradually lowering the charged voltage of the capacitor 99, the comparator 102 provides a high level signal for a short time, as shown in FIG. 12 (h).

The selective start circuit C4 will be described with reference to FIG. 9.

A rotary contact 120 of the mode selecting switch 37 is capable of switching to a contact for repeating operation 120a, a contact for single operation 120b, a contact for inching operation 120c, and a contact for interlocking operation 120d which is started by the starting signal from the external source as earlier described. To each of the contacts 120a, 120b, 120c, and 120d a resistor 121, which is connected at one end thereof to the terminal on the plus voltage side, is connected, and a contact which is in contact with the rotary contact 120 delivers a low level signal and other open contacts deliver a high level signal to the later described drive control circuit C5. A contact 122 of the starting switch 38 causes the switch 38 to be closed while it is depressed by the operator. A resistor 123 for setting, one end thereof is connected to the contact 122 and the other to the output terminal on the plus voltage side, allows, only while the contact 122 is in ON state, a low level signal to be provided to the later described drive control circuit C5. Numeral 124 designates a capacitor.

A contact 125 of the emergency return switch 32 causes the same switch 32 to be open while it is depressed by the operator. A resistor 126 for setting, one end thereof is connected to the output terminal on the plus voltage side, allows, only while the contact 125 is in OFF state, a high level signal to be provided to the later described drive control circuit C5. Numeral 127 designates a capacitor.

A gear cover switch 128, one end thereof is earthed and the other end thereof is connected to a resistor 129 for setting, is disposed on the machine frame opposed to a not shown gear cover for covering the gears 14, 15, for being normally maintained ON by the gear cover. It is turned to OFF when the gear cover is removed. When the gear cover switch 128 is turned ON a low level signal is provided to the later described drive control circuit C5. Numeral 130 designates a capacitor.

Figure 9:
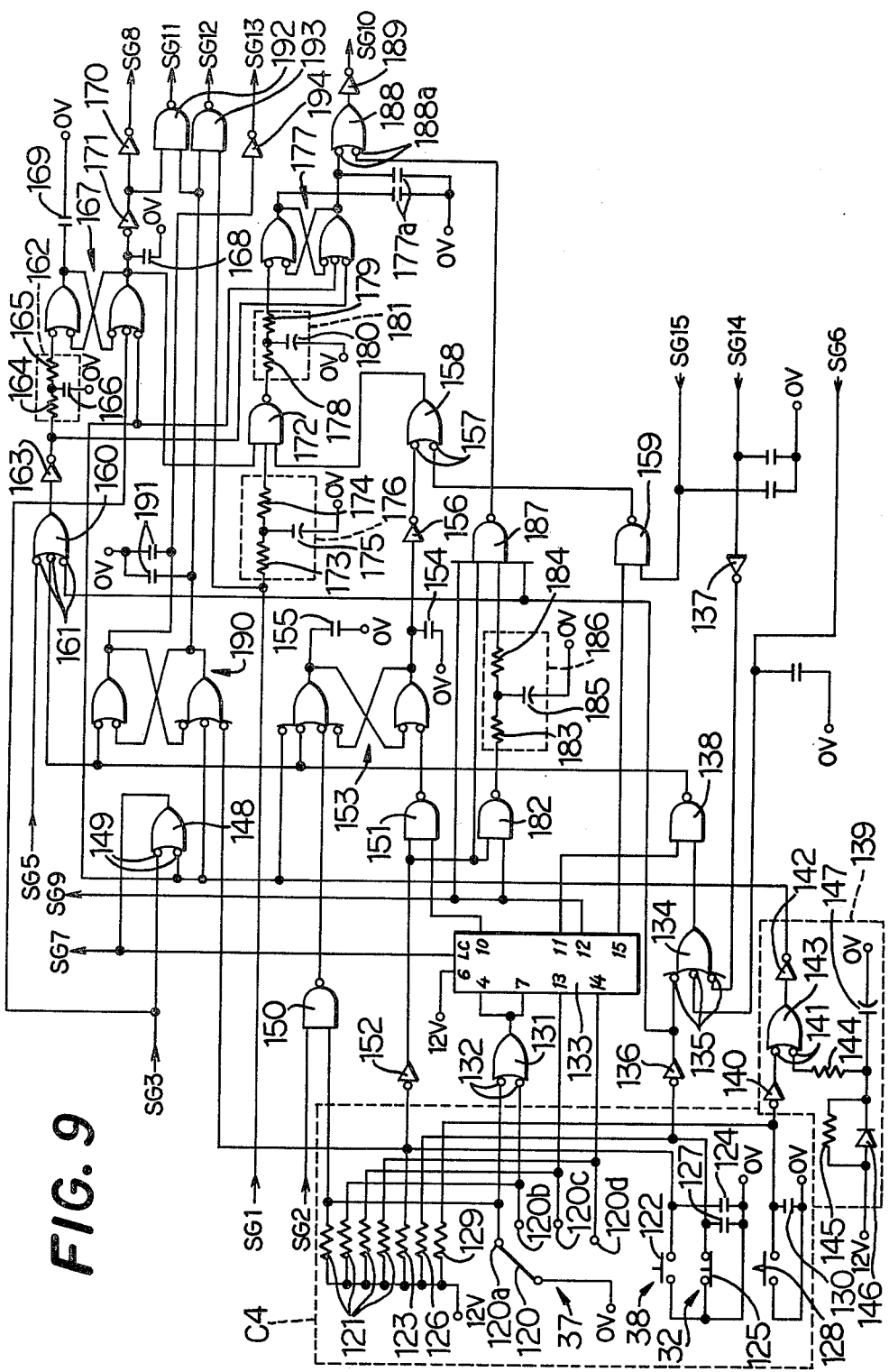
Figure 10:
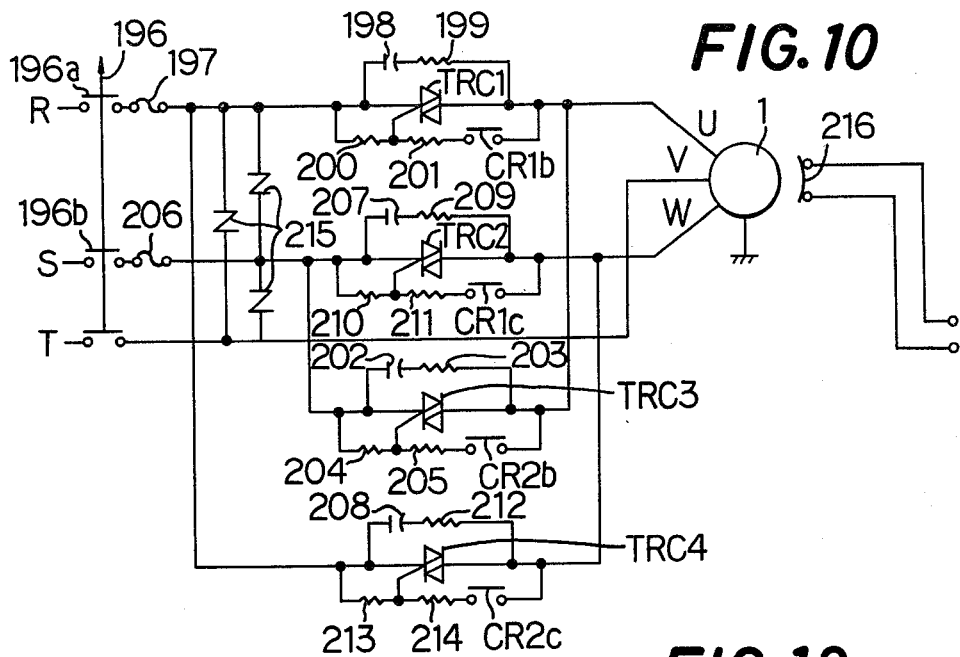
Figure 11:
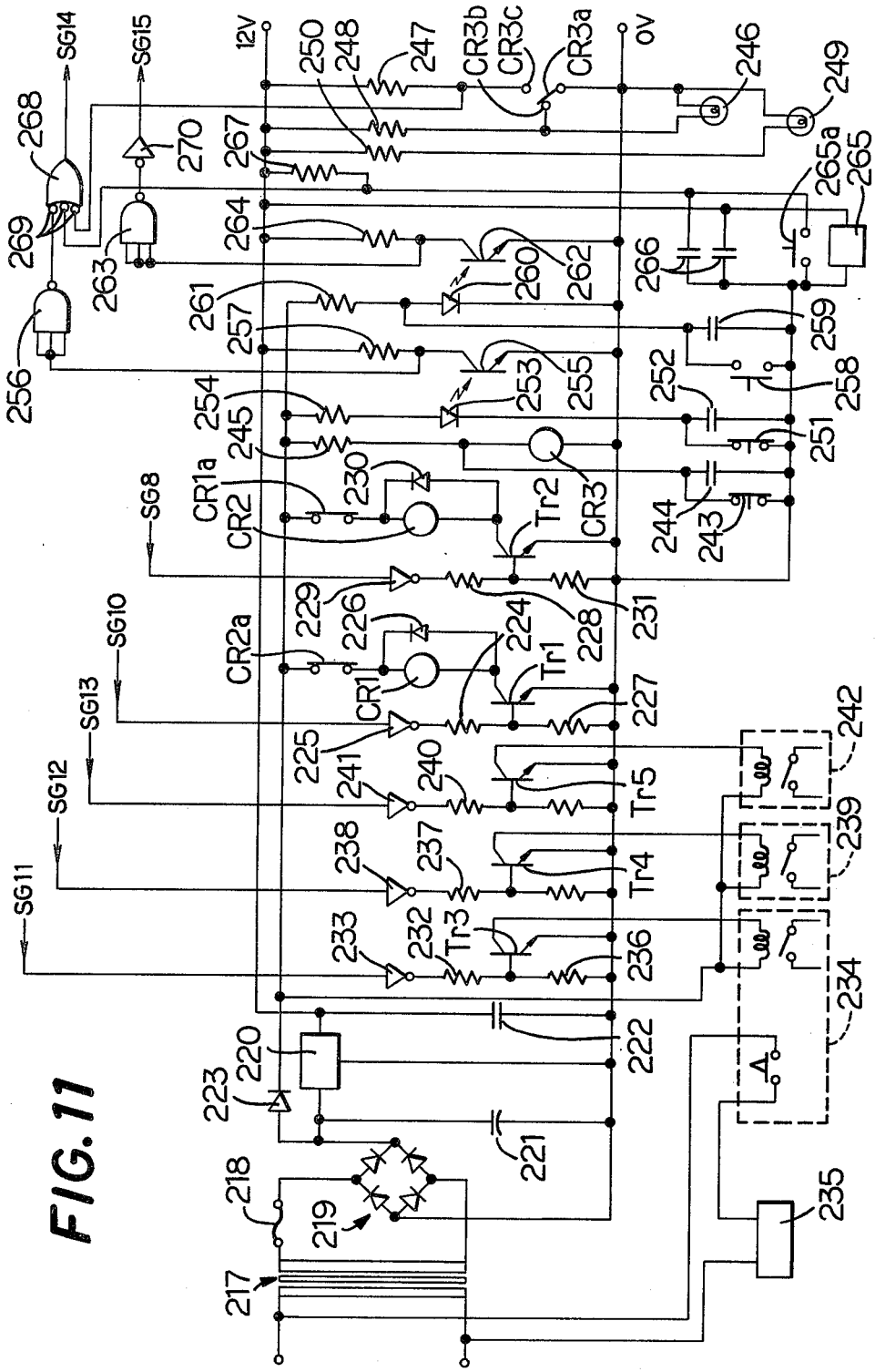

With reference to FIGS. 9-11 the drive control circuit C5 will be described.

An OR circuit 131, two of the input terminals thereof are respectively connected, via NOT circuits 132, to the contact for repeating operation 120a of the selective start circuit C4 and the contact for single operation 120b, generates a high level signal while the rotary contact 120 is in contact with either one of the contact for repeating operation 120a and the contact for single operation 120b, and a low level signal while the rotary contact 120 is in other state.

An integrated circuit 133 (hereinafter called IC), wherein to the 4th terminal and the 7th terminal thereof a signal from the OR circuit 131 is respectively delivered, to the 13th terminal a signal from the contact for inching operation 120c is delivered, and to the 14th terminal a signal from the contact for interlocking operation 120d is delivered, generates from the 10th terminal a signal at a same level with that input to the 7th terminal, from the 11th terminal a signal at a same level with that input to the 13th terminal, from the 12th terminal a signal at a reverse level to that input to the 13th terminal, and from the 15th terminal a signal at a reverse level to that input to the 14th terminal.

Therefore, at the 10th, 11th, 12th, and 15th terminal of the IC 133 respectively a signal in high level, high level, low level, and low level is generated in a circuit condition shown in FIG. 9, that is set at the repeating operation cycle.

An OR circuit 134 which receives a signal from the contact 125 of the emergency return switch 32, via NOT circuits 135, 136, the commanding signal SG6 from the overload sensing circuit C3 via a NOT circuit 135, and the later described emergency signal SG14 from an external source via NOT circuits 135, 137 as its inputs, generates a low level signal when the signal from the contact 125 is in low level, the commanding signal SG6 is in high level, that is while the tap 9 is not suspended of movement, and the emergency signal SG14 from an external source is in low level. A NAND circuit 138 receives an output of the 11th terminal of the IC 133 and an output of the OR circuit 134 as its inputs.

A control circuit 139, for setting the later described flip-flop circuits (hereinafter called FF circuit) 153, 167, 177, 190, etc., at the initial condition, consists of NOT circuits 140, 141, and 142, an OR circuit 143, a resistors 144, 145, a diode 146, and a capacitor 147. A NOT circuit 140 is connected to the gear cover switch 128 so as to receive an output signal therefrom. The initializing control circuit 139 generates, if and when power is supplied in a normally disposed condition of the gear cover, a signal rising from low level to high level, because a high level signal from the gear cover switch 128 via the NOT circuit 141, and a little later a signal rising from low level to high level from the capacitor 147, are provided to the OR circuit 143. An OR circuit 148, which receives an output signal from the initializing control circuit 139 and the output signal SG3 from the Schmidt trigger circuit 51 of the motion sensing circuit C1 as its inputs via a respective NOT circuit 149, provides an output signal SG7 thereof in a low level state to a preset input terminal PE of the counters 70a, 70b and a latch terminal LC of the IC 133, when the rotary plate 20 has been rotated in a high level state of the output from the control circuit 139, the photo-transistor 25 has been turned from ON to OFF, and the output signal SG3 has been turned from low level to high level. Consequently the output signal SG7 is, soon after the tap 9 has started the descending motion, is delivered towards the counters 70a, 70b and the IC 133, so that the counters 70a, 70b become capable of subtraction by being preset by the signal and the IC 133 become capable of receiving a signal from the mode selecting switch 37 for rendering the signal at the 10th, 11th, 12th, and 15th terminals latched.

A NAND circuit 150, which receives a signal from the contact 120a for repeating operation and the output signal SG2 from the Schmidt trigger circuit 51 as its inputs, constantly generates a high level signal, while the signal coming from the contact 120a for repeating operation is in low level, that is, while a repeated working cycle is continued.

A NAND circuit 151, which receives a start signal from the contact 122 of the starting switch 38 via a NOT circuit 152 and an output signal from the 10th terminal of the IC 133 as its inputs, generates a low level signal when the starting switch 38 is turned ON while the repeating operation or the single operation is selected, and a high level signal when the starting switch 38 is turned OFF. In the inching operation cycle and the interlocking operation cycle the NAND circuit 151 constantly generates high level signals irrespective of the ON and OFF of the starting switch 38.

An FF circuit 153 receives an output signal of the NAND circuit 151 to an input terminal thereof on the set side and output signals from the initializing control circuit 139 and from the NAND circuits 138, 150 to three of the input terminals thereof on the reset side, and the output terminal on the set side is turned from low level to high level when the NAND circuit 151 has been turned to low level by the turning to ON of the starting switch 38. Capacitors 154, 155 are respectively connected to an output terminal on the set side and the reset side of the FF circuit 153. A NOT circuit 156 receives an output signal on the set side of the FF circuit 153 as its input and delivers its output signal to an OR circuit 158 on the next stage via a NOT circuit 157. A NAND circuit 159 receives an output signal from the 15th terminal of the IC 133 to one input terminal thereof and delivers its output to the OR circuit 158 via a NOT circuit 157, and receives to the other input terminal thereof the later described start signal SG15 from an external source. Output signal from the NAND circuit 159 is in high level unless an interlocking operation started by the start signal SG15 from an external source is selected, that is to say, while the start signal SG15 from an external source and the 15th terminal of the IC 133 are both in low level.

An OR circuit 160 receives an output signal SG5 of the motion amount calculating circuit C2 via a NOT circuit 161 and output signals from the NAND circuit 138 and the NOT circuit 136 as its inputs, and generates a high level output signals in any one of the cases when the emergency return switch 32 is in OFF, when the commanding signal SG6 from the overload sensing circuit C3 is in low level, i.e., when the tap 9 has been suspended of its descending motion, or when the output signal SG5 is in low level, i.e., when the preset counter 70 has counted up accompanied by the termination of the descending motion of the tap 9 at a turn position, i.e. a work finishing position thereof. A delay circuit 162 is connected via a NOT circuit 163 to an output terminal of the OR circuit 160, being consisted of resistors 164, 165 and a capacitor 166.

An FF circuit 167 receives to two input terminals on the set side an output signal from the initializing control circuit 139 and the output signal SG3 from the Schmidt trigger circuit 51, and to the input terminal on the reset side an output signal from the delay circuit 162, and when the tap 9 has reached the work finishing position input signal to the input terminal on the reset side will be low in its level for reversing the output from the output terminal on the set side from high level to low level. Capacitors 168, 169 are respectively connected to the output terminal on the set side and the reset side of the FF circuit 167.

A NOT circuit 170 receives an output signal from the output terminal on the set side of the FF circuit 167 as its input via a NOT circuit 171, and generates a backward rotation signal SG8. The backward rotation signal SG8 will be generated in low level, when the tap 9 has reached the work finishing position and the output terminal on the set side of the FF circuit 167 is turned to low level, and will be turned to high level when the tap 9 has been returned to the start position, i.e., the original position for turning the output terminal on the set side of the FF circuit 167 to high level.

A NAND circuit 172 receives as its inputs an output signal from an output terminal on the set side of the FF circuit 167, an output signal from the OR circuit 158 and the output signal SG1 from the Schmidt trigger circuit 51 via a delay circuit 176 which consists of resistors 173, 174 and a capacitor 175, and generates a high level signal when the starting switch 38 is in ON and the tap 9 has reached the work finishing position, i.e., when the output of the FF circuit 167 is in low level, and a low level signal when the tap 9 has been returned to the start position, i.e., when the FF circuit 167 and the output SG1 have been turned to high level.

An FF circuit 177 receives to two input terminals on the set side thereof respectively an output signal from the initializing control circuit 139 and an output signal from the NOT circuit 163 and to an input terminal on the reset side thereof an output signal from the NAND circuit 172 via a delay circuit 181 which is composed of resistors 178, 179 and a capacitor 180, and the output signal from the output terminal on the set side will be turned from high level to low level when the starting switch 38 has been turned ON while the tap 9 is in the start position or when the tap 9 has been returned to the start position in the course of a working cycle, and the output signal, in the repeating operation cycle, will be turned from low level to high level when the tap 9 has reached the work finishing position, i.e., the turn position. In the single operation cycle the high level output signal SG2 is provided to the FF circuit 153 when the tap 9 has been returned to the start position, because of constant input of a high level signal from the contact 120a for repeating operation to one of the input terminals of the NAND circuit 150, to reverse the level of the FF circuit 153. And to the input terminal on the reset side of the FF circuit 177 no signal in low level for reversing the state thereof will be generated because of provision of a low level signal to the NAND circuit 172. Therefore the output signal of the FF circuit 177 will be maintained in high level, after the tap 9 has once reached the work finishing position to reverse the level of the FF circuit 177 to high. If reversing of the level of the output terminal on the set side of the FF circuit 177 again to low is desired, only turning the starting switch 33 to ON will do. Numeral 177a designates capacitors connected to the input terminals on the set side and the reset side of the FF circuit 177.

A NAND circuit 182 receives to two input terminals thereof respectively an output signal SG9 from the 12th terminal of the IC 133 and a start signal from the starting switch 38, which comes via the NOT circuit 152, and provides the output signal thereof to a delay circuit 186 consisting of resistors 183, 184 and a capacitor 185. A NAND circuit 187 receives to four input terminals thereof respectively an output signal from the dealy circuit 186, the NOT circuits 136, 152 and the output signal SG9 from the 12th terminal of the IC 133, and generates a low level signal for a limited duration of the delayed time of the dealy circuit 186 only when the starting switch 33 is depressed in a specific state wherein the mode selecting switch 37 is being set to the inching operation mode, provided that the emergency return switch 32 is not depressed in this instance.

An OR circuit 188 receives an output signal from the FF circuit 177 via a NOT circuit 188a and an output signal from the NAND circuit 187, for providing the forward rotation signal SG10 via a NOT circuit 189 in the next step. Therefore, the forward rotation signal SG10 will be low in level thereof except for the time wherein the output signals from the FF circuit 177 and the NAND circuit 187 are both in high level.

An FF circuit 190 receives to two input terminals thereof on the set side respectively an output signal from the initializing control circuit 139 and a start signal from the starting switch 38 and to an input terminal on the reset side an output signal from the NAND circuit 138, and provision thereto of a start signal by means of depressing the starting switch 38 will reverse the output signal on the set side to high level and the output signal on the reset side to low level. When a low level output signal is provided to the FF circuit 190 from the NAND circuit 138, which occurs when the tap 9 has been suspended of the descending motion thereof or the emergency return switch 32 has been depressed, the output signal on the set side will be reversed to low level and the output signal on the reset side to high level. Numeral 191 designates capacitors which are connected to output terminals on the set side and reset side of the FF circuit 190.

A NAND circuit 192 receives an output signal from an output terminal on the set side of the FF circuit 190 and an output signal from the NOT circuit 171 for generating an index signal SG11. A NAND circuit 193 receives as its inputs an output signal from an output terminal on the set side of the FF circuit 190 and the output signal SG1 from the Schmidt trigger circuit 51 for providing a starting point signal SG12. A NOT circuit 194 receives as its input an output signal from an output terminal on the reset side of the FF circuit 190 for providing an abnormal condition warning signal SG13 outwardly.

A triphase power switch 196 shown in FIG. 10 supplies electric power to the motor 1 through each of the three phase lines U, V, and W. A triac TRC1 is connected at one end thereof via a fuse 197 to a contact 196a of the triphase power switch 196; and a series circuit of a capacitor 198 and a resistor 199 and another series circuit of resistors 200, 201 and a normal open contact CR1b of a later described electromagnetic relay CR1 are respectively connected to the triac TRC1 in parallel. A gate terminal of the triac TRC1 is connected to a middle point between the two resistors 200, 201, constituting a power supplying circuit for the forward rotation of the motor 1. And the U phase line of the motor 1 is similarly connected to a contact 196b of the power switch 196, via a power supplying circuit for the backward rotation consisting of a triac TRC3, a capacitor 202, resistors 203, 204, and 205, and a normal open contact CR2b of an electromagnetic relay CR2. Numeral 206 designates a fuse. Similarly between the W phase line of the motor 1 and the contact 196b of the power switch 196 as well as between the W phase line and the contact 196a, a power supplying circuit for forward rotation and a power supplying circuit for backward rotation are respectively connected, the former circuit consisting of the triac TRC2, a capacitor 207, resistors 209, 210, 211 and a normal open contact CR1c of the later described electromagnetic relay CR1 and the latter consisting of a triac TRC4, a capacitor 208, resistors 212, 213, 214 and a normal open contact CR2c of the later described electromagnetic relay CR2. Numeral 215 designates varistors.

A resistor for temperature sensing 216 disposed in the vicinity of the motor 1 senses the motor approaching a resistible temperature limit so as to control the opening and closing of a later described thermo-switch 243.

A transformer 217 shown in FIG. 11 which receives on its primary side power of two phases of the triphase power current, is connected by way of a fuse 218 to a rectifying circuit 219 between the two output terminals on the secondary side thereof. A constant voltage regulator 220 is connected to the rectifying circuit 219 between the two output terminals thereof for supplying DC of 12 V to each of the motion sensing circuit C1, the motion amount calculating circuit C2, etc. Numerals 221 and 222 designate respectively a capacitor and numeral 223 a diode.

A transistor Tr1 receives to the base terminal thereof the forward rotation signal SG10 via a resistor 224 and a NOT circuit 225, being connected to at the collector terminal thereof a series circuit consisting of the electromagnetic relay CR1 and a normal close contact CR2a of a later described electromagnetic relay CR2. Numeral 226 designates a diode parallelly connected to the electromagnetic relay CR1 and numeral 227 designates a resistor.

A transistor Tr2 receives to the base terminal thereof via a resistor 228 and a NOT circuit 229 the backward rotation signal SG8 as its inputs; to the collector terminal thereof is connected a series circuit consisting of the electromagnetic relay CR2 and a normal close contact CR1a of the electromagnetic relay CR1. Numeral 230 designates a diode parallelly connected to the electromagnetic relay CR2 and numeral 231 designates a resistor.

When a low level forward rotation signal SG10 is provided to the transistor Tr1, the backward rotation signal SG8 being in high level at this time, it will be turned ON for energizing the electromagnetic relay CR1. It makes the normal close contact CR1a open and simultaneously close the normal open contacts CR1b and CR1c, turning consequently ON the triacs TRC1 and TRC2 in FIG. 10 so as to supply power to each phase line U, V, and W. The motor 1 begins to forwardly rotate by this power supply. On the contrary, when a low level backward rotation signal SG8 is provided to the transistors Tr2, the forward rotation signal SG10 being in high level at this time, it will be turned ON for energizing the electromagnetic relay CR2. It makes the normal close contact CR2a open and simultaneously close the normal open contacts CR2b and CR2c, turning consequently ON the triacs TRC3 and TRC4. The motor 1 will be supplied with power reversed in phase so as to backwardly rotate.

A transistor Tr3 receives to the base terminal thereof the index signal SG11 from an external source via a resistor 232 and a NOT circuit 233 for rendering an index timer 234 operative everytime the transistor Tr3 is turned ON. Based on the operation of the index timre 234 an electromagnetic counter 235 becomes active so as to count the number of works processed, i.e. tapped. Numeral 236 designates a resistor.

A transistor Tr4 receives to the base terminal thereof the starting point signal SG12 via a resistor 237 and a NOT circuit 238 for rendering a starting point relay 239 operative everytime the transistor Tr4 is turned ON. The relay 239 delivers outwardly a signal of finishing of one working cycle at each completion thereof.

A transistor Tr5 receives to the base terminal thereof the abnormal condition warning signal SG13 via a resistor 240 and a NOT circuit 241 for rendering an abnormal condition warning relay 242 operative to inform the wrong or the abnormal condition outwardly when the transistor Tr5 has been turned ON, that is, when the motion of the tap 9 has been suspended.

A thermo-switch 243 is made open, when the motor 1 has been overheated up to the limit of the resistible temperature, by means of the resistor for temperature sensing 216. By the opening of the thermo-switch 243 which is being parallelly connected with a capacitor 244, an electromagnetic relay CR3 which is connected in series with a resistor 245 will be energized. A movable contact CR3a of the electromagnetic relay CR3 is then changed from a contact CR3b to a contact CR3c to light a motor-overheat-warning lamp 246. Numeral 247, 248 designate respectively a resistor, numeral 249 designates a power source pilot lamp, and numeral 250 designates a resistor.

An external emergency return switch 251 capable of being open by depressing thereupon is attached to a processing machine such as the work feeder 28 which is interlockingly operative with the tapping machine, being parallelly connected with a capacitor 252.

An LED 253 is connected at one end thereof to the external emergency return switch 251 and at the other end to a resistor 254, being constantly luminescent unless the switch 251 is depressed. A photo-transistor 255 which is turned ON upon receiving light from the LED 251, provides a high level signal to a NAND circuit 256 when the external emergency return switch is amde open. Numeral 257 designates a resistor.

An external starting switch 258 capable of being open by depressing thereupon and attached to a processing machine which is interlockingly operative with the tapping machine, is parallelly connected with a capacitor 259. An LED 260 parallelly connected with the external starting switch 258 is luminescent while the latter is being kept open, to one end thereof a resistor 261 being connected. A photo-transistor 262 is turned ON upon receiving light from the LED 260 for providing to a NAND circuit 263 a high level signal when the external starting switch 258 is closed, and a low level signal when the external starting switch 258 is opened. Numeral 264 designates a resistor which is connected to the collector terminal of the photo-transistor 262.

A proximity switch (non contact switch) 265, which is disposed in the vicinity of a not shown clutch disposed on the lower side of the pulley 3a fixedly attached to the drive shaft 2, is closed at a contact 265a thereof when the clutch is released due to a too heavy torque applied to the drive shaft 2. Numeral 266 designates capacitors and numeral 267 designates a resistor.

An OR circuit 268 receives an output signal from the NAND circuit 256 via a NOT circuit 269 and signals caused by opening and closing of the proximity switch 265 and the movable contact CR3a of the electromagnetic relay CR3, for generating an external abnormal condition warning signal SG14 of low level, when all of the input signals which it takes in are in high level, as an input to the OR circuit 134 via NOT circuits 137 and 135.

A NOT circuit 270 receives the output signal from the above-mentioned NAND circuit 263 for providing, when the output signal from the NAND circuit 263 is in low level, an external start signal SG15 of high level as an input to the NAND circuit 159.

Function of the tapping machine having the overload sensing device of the above-mentioned structure will be described next.

When the tapping machine is operated in a mode of repeating operation cycle, the triphase AC power switch 196 is turned ON and DC power is supplied to each of the five circuits C1, C2, C3, C4, and C5, which turns the output signal of the initializing control circuit 139 from low level to high level before being delivered to each of the FF circuits 153, 167, 177, and 190. Then the mode selecting switch 37 is rotated as shown in FIG. 9 to the contact 120a. When the preset subtraction counter 70 is set the stroke setting dial 34 is operated such that the descending range of the tap 9 from its start position for tapping in a pre-bored hole 20a in a work 20 is determined for example at 47 mm. In this situation on the set side of the FF circuit 153 the output terminal will be set in low level, on the set side of the FF circuit 167 the output terminal will be set in high level, and on the set side of the FF circuit 177 the output terminal will be set in high level. And the output signal of the NAND circuit 187 is in high level. Therefore, the forward rotation signal SG10 and the backward rotation signal are both in high level. The motor 1 is not driven in this state because of the electromagnetic relays CR1 and CR2 being in no energization.

When the start switch 38 is depressed to drive the motor 1 for starting the tapping operation, a low level signal is input to the input terminal of the FF circuit 153 on the set side thereof, and the output of the set side thereof will be reversed to high level to make the OR circuit 158 in the next step high in level. The output signal SG1 of the Schmidt trigger circuit 51 is at this stage in high level, so the output signal of the NAND circuit 172 is changed from high level to low level for reversing the output of the set side of the FF circuit 177 from high level to low level. Therefore, the forward rotation signal SG10 will be low level to turn the transistor Tr1 ON and to energize the electromagnetic relay CR1, which will close the normal open contacts CR1b and CR1c and turn the triacs TRC1 and TRC2 ON. It will in turn supply power to each of the phase lines U, V, and W for initiating the forward driving of the motor 1.

Simultaneously with the commencement of the descending motion of the tap 9, the rotary plate 21 begins to rotate within a sphere of one rotation. The rotation of the rotary plate 21 makes the photo-transistor 27 ON and OFF for continuously generating the output signal SG4 in the form of continuous or consecutive pulses from the Schmidt trigger circuit 61. The present subtraction counter 70 carries out the subtraction in response to each rising of the output signal SG4. Although the output signal SG1 is turned to low level due to the rotation of the rotary plate 21 on one hand, the output of the FF circuit 177 will not be reversed. In this stage the output signal on the set side of the FF circuit 167 is in high level and the normal close contact CR1a of the electromagnetic relay CR1 is in open state due to the energization thereof, so the electromagnetic relay CR2 will not be energized to restrict the backward rotation of the motor 1.

When the tap 9 has descended while processing the tapping along the entire range of the preset distance 47 mm and the preset subtraction counter 70 has counted all of the 47 rising of the output signal SG4, the subtraction counter 70 will be zero after having performed the 47 times subtraction for making all of the output signals of the output terminals $A_o$, $B_o$, $C_o$, and $D_o$ low level and the output signal of the NAND circuit 73 high level. It makes the output signal SG5 turn from high level to low level, for providing a low level signal to the input terminal on the reset side of the FF circuit 167 via the delay circuit 162, with a result of reversing the output signal on the set side thereof from high level to low level. Since a low level signal is simultaneously provided to the input terminal on the set side of the FF circuit 177, the output signal on the set side thereof is turned from low level to high level. As the forward rotation signal SG10 and the backward rotation signal SG8 are respectively reversed to high level and low level, the transistor Tr1 will be OFF to energize the electromagnetic relay CR1, on the other hand the transistor Tr2 will be ON to energize the electromagnetic relay CR2. While the normal open contacts CR1b and CR2c are kept open, the normal open contacts CR2b and CR2c are made close, so the power supplied to the motor 1 will be reversed in the phase thereof to backwardly rotate the same. The tap 9 is ascended upwards while backwardly rotating due to the backward rotation of the motor 1.

In response to the reaching of the tap 9 to the start position the output signal SG1 will be turned to high level while the output signal SG3 turned to low level, and the output signal SG7 will be turned to high level to make the subtraction counter 70 to be preset. And the output signal SG3 reverses the output of the set side of the FF circuit 167 from low level to high level, which turns the NAND circuit 172 from high level to low level and reverses the output of the set side of the FF circuit 177 from high level to low level. Then the forward rotation signal SG10 is turned again to low level and the backward rotation signal SG3 to high level, which makes the motor 1 begin to rotate forwardly and allows the tap 9 to descend again, enabling the repeating operation cycle of the tapping machine.

Assume an instance wherein a work 20 is not provided with a pre-bored hole 20a and the tap 9 has been suspended of descending motion in the course thereof, that is, when the forward rotation signal SG10 is in low level, a too heavy torque applied on the rotary shaft 16 will release the clutch 19 of multiple plate type to stop the rotation of the rotary plate 21 fixed to the pinion shaft 17, with a result of keeping the output signal SG4 from the Schmidt trigger circuit 61 at its low level or high level state. Then the transistor 111 for switching of the overload sensing circuit C3 is turned ON to make the LED 113 luminescent to inform the operator of the tap 9 being in an abnormal condition in the course of descending; and the commanding signal SG6 reversed from high level to low level is provided to the OR circuit 134 of the drive control circuit C5 to turn the output signal thereof from low level to high level. The turning of the output signal of the OR circuit 134 to high level makes the output signal of the NAND circuit 138 in the next step low level, which turns via the OR circuit 160 and the NOT circuit 163 the output signal on the set side of the FF circuit 177 from low level to high level, and reverses the output signal on the set side of the FF circuit 167 from high level to low level via the NOT circuit 163 and the delay circuit 162. Consequently the forward rotation signal SG10 becomes high level and the backward rotation signal SG8 becomes low level for making the motor 1 to be backwardly rotated accompanied by instant ascending of the tap 9 back to the start position.

When the tap 9 has been returned to the start position the Schmidt trigger circuit 51 generates the output signal SG1 and acts on the FF circuit 177 to reverse the output thereof to low level, but the FF circuit 177 is not reversed because the output signal of the FF circuit 153 on the set side has been reversed to low level due to the low level output signal of the NAND circuit 138. It will restrict the tap 9, which has been returned to the start position, from starting the next process. It assures a safe tapping process to be carried out, and that the tap 9 can be stopped of the motion in a quite short time by the overload sensing operation, when it has been suspended of the descending motion, no matter where it is positioned in the descending course.

When the tap 9 is returned to the start position in the middle course of a tapping process leaving the unfinished process as it is, the output signal on the set side of the FF circuit 190 becomes low level due to the reversion caused by the low level output signal of the NAND circuit 138 to keep the index signal SG11 and the starting point signal SG12 at high level, and consequently to restrict the index timer 234 and the starting point relay 239 respectively from operation. The FF circuit 190 can be reversed only by depressing anew of the start switch 38.

In an instance wherein the mode selecting switch 37 is rotated to the contact 120b for simple operation for making the tapping machine work in the simple operation mode, only the input condition to the NAND circuit 150 is different from the previous instance of repeating operation mode, in which the signal input from the contact 120a for repeating operation is in high level. The process of the motor operation from start to backward rotation is just the same. When the tap 9 has been retracted to the start position a high level output signal SG2 is provided to the NAND circuit 150 for reversing the output signal of the FF circuit 153 to low level, and in turn, to make the output of the OR circuit 158 low level. It prevents the output signal of the NAND circuit 172 from becoming low level due to the output signal SG1 of high level which is delivered slightly delayed through the delay circuit 176. As the output signal on the set side of the FF circuit 177 is not turned to low level, the motor 1 which has completed the backward rotation can not be forwardly driven again. That is why the tapping machine can conduct a single operation processing. If in the course of the single operation the tap 9 is suspended of the descending motion by chance, the forward rotation signal SG10 will be reversed to high level and the backward rotation signal SG8 to low level, similarly to the previous repeating operation cycle case, so as to restore the tap 9 back to the start position.

When the mode selecting switch 37 is rotated to the contact 120c for inching operation for the purpose of conducting an inching operation of the tapping machine, the output signal of the 10th terminal of the IC 133 will be low level, and the output signal of the 12th terminal will be high level, so the FF circuit 153 will not be reversed even when the start switch 33 is depressed. As the output signal SG9 of high level is provided to the NAND circuit 73 of the motion amount calculating circuit C2 from the 12th terminal of the IC 133, the FF circuits 167, 177 can not be operated to reverse the signal level even after the counting up of the subtraction counter 70.

Depressing of the start switch 38 at this stage will turn the NAND circuit 187 to low level for the delayed time caused by the delay circuit 136, rendering the output signal of the OR circuit 188 in the next step high level and the forward rotation signal SG10 low level. It allows the motor 1 to forwardly rotate, causing the tap 9 to be descended.

For restoring the tap 9 to the start position only depressing of the emergency return switch 125 will do. The FF circuit 167 will be reversed by way of the NOT circuits 136, 161, the OR circuit 160, and the NOT circuit 163 to make the backward rotation signal SG8 low level. The forward rotation signal SG10 will be high level to restore the tap 9 to the start position.

When the mode selecting switch 37 is rotated to the contact 120d for interlocking operation started by the external start signal SG15 (external signal from other processing machine), the output signal of the 15th terminal of the IC 133 will be high level to be delivered to the NAND circuit 159 in the next step. The output of the NAND circuit 159 will be made low level, by the external start signal SG15 from other processing machine (closing operation of the external start switch 258 in this embodiment), to provide a high level output signal to the NAND circuit 172 in the next step via the OR circuit 158. The output signal on the set side of the FF circuit 177 which is reversed to low level will rotate the motor 1 in the forward direction. Therefore, the tapping machine can be controlled of its driving synchronously with other processing machine owing to an output signal from the NAND circuit 159 which belongs to another route of the FF circuit 153 for the repeating operation cycle, that is to say, owing to the external start signal SG15.

Even in this case the tap 9, when it is suspended of the descending motion, can be restored to the start position along the same route or process of backwardly rotating the motor 1 as in the repeating operation cycle.

As described in greater detail above this invention has been successful in providing a tapping machine which allows safe tapping process owing to an excellent overload sensing device. The tap can be, no matter where it is positioned in the descending motion, sensed of an overload through constant overload watching operation for being stopped of its motion, so long as an overload suspending the motion of the tap has been sensed anywhere, in a quite short time. Even in a repeating operation mode, the continuous operation can also be stopped instantly when an overload has been sensed irrespective of the progressing of the repeating operation. This invention is greatly meritorious for the industrial circle.

What is claimed is:

1. A tapping machine comprising:
   a frame,
   a quill reciprocably mounted on said frame,
   a spindle rotatably mounted in, and reciprocated with, said quill, carrying a screw tap at one end thereof,
   a reversible electric motor operatively connected to said spindle so as to rotate said spindle in forward and backward direction,
   quill feed means operatively connected to said motor so as to move said quill in advancing and returning direction, and including an overload release clutch for disconnecting the power transmission from said motor to said quill when overload is applied to said quill in forward movement of said quill,
   pulse-signal generating means disposed between said overload release clutch and said quill for generating a pulse-signal each time said quill moves one unit distance in forward movement of said quill,
   means for setting a stroke of the forward movement of said quill,
   preset counter for memorizing the number of pulse-signals corresponding to said stroke of said quill,
   turn position sensing means for generating a turn position sensing signal when the number of pulse-signals from said pulse-signal generating means accords with the number of pulse-signals memorized in said preset counter,
   a driving circuit connected to said electric motor for performing a working cycle, in which said quill advances and said spindle forwardly rotates before the generation of the turn position sensing signal from said turn position sensing means, and then said quill returns to a start position thereof and said spindle backwardly rotates after the generation of the turn position sensing signal from said turn position sensing means,
   overload sensing means for generating an overload sensing signal when the interval of generation of pulse-signal by said pulse-signal generating means is longer than a predetermined time, and
   means for controlling said driving circuit to reverse the rotational direction of said motor when said overload sensing signal is generated from said overload sensing means.

2. A tapping machine according to claim 1, further comprising
   means for warning abnormal condition of the machine to an operator when said overload sensing signal is generated from said overload sensing means.

3. A tapping machine according to claim 1, wherein said driving circuit includes a start switch for energizing said motor so as to advance said quill and forwardly rotate said spindle.

4. A tapping machine according to claim 1, wherein said pulse-signal generating means comprises
   a scale disposed between said overload release clutch and said quill, and moved in proportion to the movement amount of said quill;
   said scale having a plurality of slits formed at regular intervals;
   photo-sensing means disposed on said frame for sensing said slit; and
   a one-slot-pulse generator connected to said photo-sensing means for generating one-slot-pulse each time said photo-sensing means senses said slit.

5. A tapping machine according to claim 4, wherein said quill feed means further includes
   a drive shaft operatively connected to said electric motor and a driven shaft coaxially disposed on said drive shaft and having a pinion engaged with a rack formed on said quill, said overload release clutch being disposed between said drive shaft and said driven shaft, and
   said scale is a rotary disk fixed on said driven shaft and having a plurality of slits concentrically formed about the axis of said driven shaft.

6. A tapping machine comprising:
   a frame,
   a quill reciprocably mounted on said frame,
   a spindle rotatably mounted in, and reciprocated with, said quill, carrying a screw tap at one end thereof,
   a reversible electric motor operatively connected to said spindle so as to rotate said spindle in forward and backward direction,
   quill feed means operatively connected to said motor so as to move said quill in advancing and returning direction, and including an overload release clutch for disconnecting power transmission from said motor to said quill when overload is applied to said quill in forward movement of said quill,
   pulse-signal generating means disposed between said overload release clutch and said quill for generating a pulse-signal each time said quill moves one unit distance in forward movement of said quill,
   means for setting a stroke of the forward movement of said quill,
   preset counter for memorizing the number of pulse-signals corresponding to said stroke of said quill,
   turn position sensing means for generating a turn position sensing signal when the number of pulse signals from said pulse-signal generating means accords with the number of pulse-signals memorized in said preset counter,
   start position sensing means for generating a start position sensing signal when quill has returned to a start position thereof,
   a driving circuit connected to said electric motor for performing a working cycle, in which said quill advances and said spindle forwardly rotates before the generation of the turn position sensing signal from said turn position sensing means, and said quill returns to said start position thereof and said spindle backwardly rotates after the generation of the turn position sensing signal from said turn position sensing means,
   a first control circuit connected to said driving circuit for stopping said motor in response to said start position sensing signal after the performance of said working cycle,
   a second control circuit connected to said driving circuit for making said driving circuit repeat said working cycle notwithstanding the generation of said start position sensing signal,
   selecting means for selecting either said first control circuit or said second control circuit, overload sensing means for generating a overload sensing signal when the interval of generation of pulse-signal by said pulse-signal generating means is longer than a predetermined time, and means for controlling said driving circuit to reverse the rotational direction of said motor when said overload sensing signal has been generated from said overload sensing means and to stop said motor in response to said start position sensing signal regardless of the state of said selecting means.

7. A tapping machine according to claim 1 or 6, wherein said overload sensing means comprises a C-R timer for measuring said predetermined time.

* * * * *